Aug. 4, 1964   E. S. MEYER   3,142,899
EXTRACTOR
Filed Oct. 12, 1960
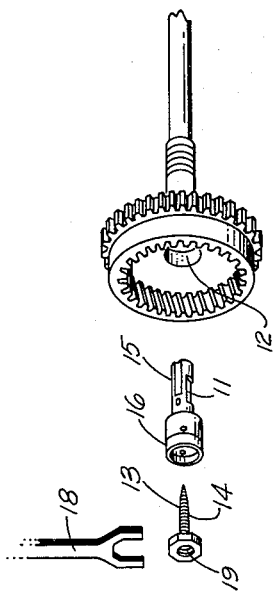
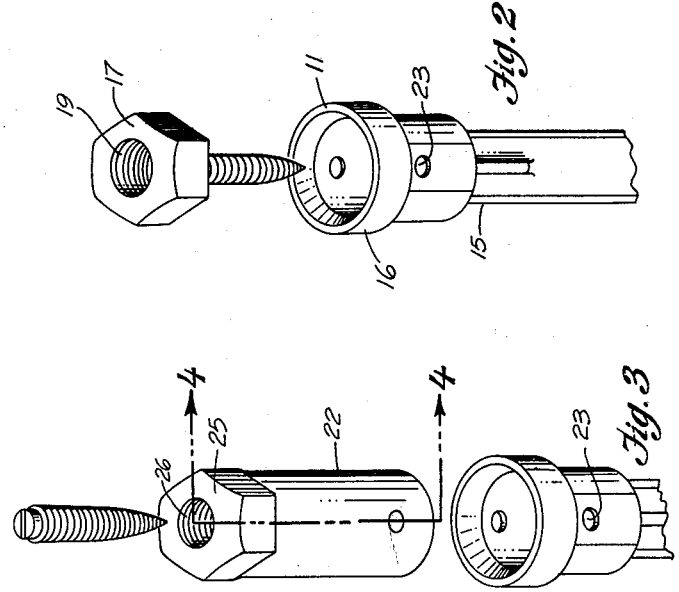
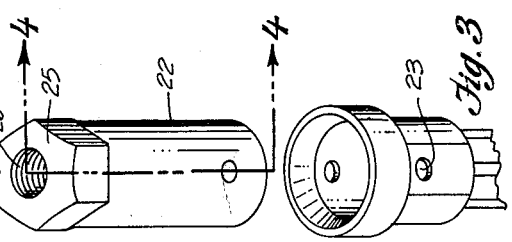
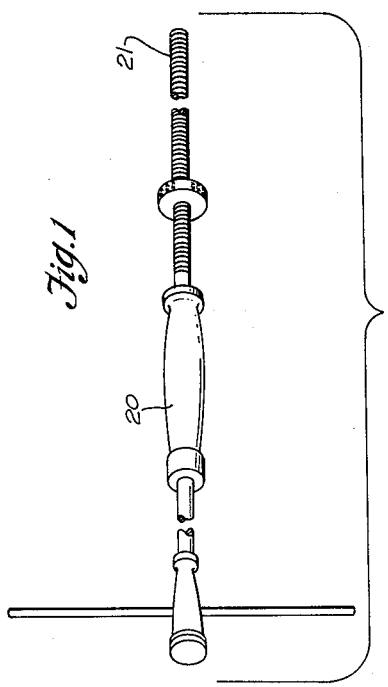
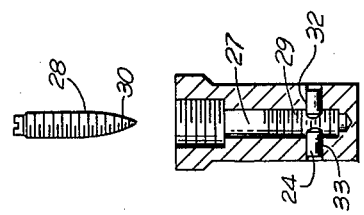
EDWARD S. MEYER
INVENTOR.
BY
ATTORNEY

United States Patent Office 3,142,899
Patented Aug. 4, 1964

3,142,899
EXTRACTOR
Edward S. Meyer, 520 Fairfield Ave., Ridgewood, N.J.
Filed Oct. 12, 1960, Ser. No. 62,207
1 Claim. (Cl. 29—275)

The present invention relates to an extraction device useful in the extraction or removal of certain automobile, vehicle or automotive equipment, and more particularly to an extraction device used in removing bushings.

Automatic transmission bushings are contained in the rear output shaft of the automatic transmission. It is well known that these bushings wear out and have to be periodically replaced. Heretofore, the removal of these bushings has always presented a problem. The bushing is lodged towards the output end of the rear output shaft. The bushing is cylindrical in shape and generally includes a large diameter bushing head section, and a narrow diameter upper cylindrical body portion. The bushing is so constructed as to fit snug tight in the shaft. Since only worn bushings are removed, damage to the bushing in its removal is no problem. However, damage to the inner portion of the rear output shaft is a problem. Therefore, automobile mechanics spend considerable time on this particular job thereby vastly increasing the cost of this operation.

It has now been discovered that automatic transmission bushings as well as other automotive parts and components can be readily removed in a simple and efficient way.

Thus, it is an object of the present invention to provide a way of readily removing certain automotive components, e.g., bushings.

Another object of the present invention is to provide a device useful in removing certain automotive components, e.g., bushings.

Still another object of the present invention is to provide a tool useful in the removal of automotive parts which is of simple construction, easy and inexpensive to manufacture.

With the foregoing brief explanation in view, the invention resides in the novel arrangement hereinafter described and claimed, it being understood that changes in the precise embodiment of the invention herein disclosed may be made within the scope of that which is claimed without departing from the spirit of the invention. The invention will become apparent from the following description taken in conjunction with the accompanying drawing in which:

FIGURE 1 is an exploded view of the manner of removing a bushing herein contemplated depicting the automotive parts and tools used including the tool herein contemplated;

FIG. 2 is an enlarged view of the tool herein contemplated;

FIG. 3 is another embodiment of the tool herein contemplated;

FIG. 4 is a cross sectional view of the tool depicted in FIG. 3 along the lines 4—4 thereof;

And, FIG. 5 is a view similar to FIG. 4 but at a different time period during the operation herein contemplated.

Referring now to the drawing, the bushing 11 is firmly lodged in the hollow output end of the rear output shaft 12. As has hereinbefore been explained, this bushing must be periodically replaced. To replace the bushing, it is necessary to slide the bushing out of the shaft. But, the bushing is firmly set in the shaft and is usually difficult to dislodge. To remove the bushing, use is made of a bolt-like threaded tool 13. Threaded tool 13 must be provided in various sizes so as to fit the particular bushings to be removed. Thus, there is a threaded portion 14 sized to screw into the bushing hollow section 15 located past the bushing head 16. At first glance, threaded tool 13 resembles an ordinary bolt. And indeed, the threaded portion 14 is almost identical with the corresponding portion of similar bolts except that it is sized to engage a particular bushing. The head portion 17 of tool 13 is of hexagonal shape and may be turned by the usual wrench 18. The principal difference between threaded tool 13 and an ordinary bolt is the fact that the tool head portion 17 has a threaded hollow portion 19.

To remove a bushing 11 lodged in the output end of the rear output shaft 12, threaded tool 13 is screwed into the bushing by applying a wrench 18 to the tool head portion 17 until the tool threaded portion 14 has well penetrated and firmly engaged the bushing hollow section 15 past bushing head 16. To remove the tool and bushing assembly, use is made of a slide hammer 20. This slide hammer is a standard tool in an automotive shop. However, the slide hammer engaging end 21 of the slide hammer must be threaded so as to engage the threaded hollow portion 19 of threaded tool 13. When purchasing a slide hammer with bushing removal as one of the objectives, care must be taken that engaging end 21 of the hammer purchased may be threaded to a size adapted to engage tool head 17.

With the tool 13 and bushing 11 forming one solid assembly, engaging end 21 of slide hammer 20 is screwed into the threaded hollow portion 19 of tool head 17. The bushing 11 will readily come out after only a few strong hammer strokes.

The tool hereinbefore described will remove the bushing in most instances. However, the wise mechanic will first view and feel the bushing to be removed, and, for several reasons may be of the opinion that it is not advisable to have the tool threaded portion 14 penetrate into the bushing hollow section 15. In such case, use is made of a bushing head tool 22. As shown in the drawing, the bushing has a plurality of apertures 23 in the bushing head 16. Bushing head tool 22 is adapted to enter the bushing head only and has engaging members 24 which will engage these apertures 23.

Bushing head tool 22 has a tool head portion 25 somewhat similar to tool head 17. Thus, the head is of hexagonal shape and can be engaged by the usual wrench 18. Tool head portion 25 has a hollow threaded portion 26 which can be engaged by the engaging end 21 of slide hammer 20.

The principal difference between bushing head tool 22 and threaded tool 13 is that head tool 22 has no external threaded portion. The bushing apertures 23 are to be engaged by engaging members 24. To accomplish this, at the bottom of threaded hollow portion 26 of head 25 and extending therefrom longitudinally through tool 22 is a longitudinal aperture 27. When a screw 28 is placed in this aperture, it soon reaches a threaded portion therein 29. The screw to be used may be any regular pointed screw sized to engage threads 29 and having a screw tip 30 which is pointed. Bushing head tool 22 has a body portion 31, longitudinal aperture 27 being at the center thereof. This body portion 31 is sized differently for different bushing heads and is adapted to enter snugly the bushing head. At the body portion corresponding to bushing apertures 23 are a plurality of transverse passages 32. Engaging members 24 are loosely housed in these transverse passages 22 and have displaceable tips 33 which are either inclined flat, pointed, or frustro-conical in shape. After the tool body portion is fitted into the bushing head, it is so aligned that the engaging members 24 are opposed to the bushing head apertures 23. Transverse passages 32 communicate internally with longitudinal aperture 27 and when the screw 28 pushes through longitudinal aperture 27, it pushes engaging members 24 out through bushing head apertures 23. After engaging members 24 have firmly engaged the bushing 11 through apertures 23, the bushing is removed in exactly the same way as when using tool 13, i.e., slide hammer engaging end 21 is screwed into the tool head portion 25 and the bushing is then hammered out.

The question of which tool to use first, 22 or 13 must be left up to the individual mechanic. Many mechanics will prefer to first try the bushing head tool 22 and if they have no success with this tool or if the bushing head breaks off, they can then remove the internal portion of the bushing using tool 13.

It is to be observed therefore that the present invention provides for a method of removing automotive parts which are lodged in other components, e.g., bushings, and includes the steps of engaging the bushing with a tool having two principal sections, an engaging section which is adapted to engage a readily engageable portion of the bushing, e.g., the bushing hollow body section or the bushing head section, and a coupling section which may be readily coupled to another tool such as a slide hammer. After the bushing has been firmly engaged by the engaging section of the tool, the coupling section is coupled to a removing tool or slide hammer and the bushing is hammered out. Two embodiments of the tool for removing the bushing are preferred, one embodiment comprises an internally threaded head section and an outwardly threaded body section sized to enter and engage the bushing hollow body. The other embodiment has an internally threaded head section, a body adapted to fit into the bushing head, transverse passages in said tool body head at the level of the bushing apertures, displaceable engaging members lodged in said transverse passage, a threaded longitudinal passage communicating with said transverse passages, and a screw adapted to be threaded into said longitudinal passages and push the engaging members out through the bushing head apertures.

The tool herein described not only has utility in the removal of bushings but may also be used in removing other automotive parts, e.g., seals.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

What is claimed is:

An extractor tool for removing a bushing lodged in the rear output shaft of an automobile automatic transmission, comprising in combination, an elongated cylindrical tool body section adapted to penetrate said bushing head portion, sized to fit into the head of the bushing to be extracted, transverse passages in said tool body section at about the level of corresponding apertures in said bushing head portion, engaging members lodged in said transverse passages adapted to be moved outwardly therefrom and penetrate said bushing head apertures, tapered inner tips on said engaging members, an internally threaded longitudinal passage in said tool body section communicating with said transverse apertures, a polygon shaped head section on said tool body section adapted to be engaged by a wrench and turned so as to work said tool body section into said bushing head, a threaded internal hollow section in said head section of the tool adapted to be engaged by the threaded end of a slide hammer, the diameter of said hollow section being larger than the diameter of said internally threaded longitudinal passage, and, a screw insert with a tapered tip insertable in said longitudinal passage adapted to engage said engaging member's tapered tips and push said members outwardly, the diameter of said screw member being such as to pass completely through said head section and engage only the internally threaded longitudinal passage of said body section.

References Cited in the file of this patent

UNITED STATES PATENTS

| | | |
|---|---|---|
| 577,812 | Tadder | Feb. 23, 1897 |
| 674,475 | Schuster | May 21, 1901 |
| 869,861 | Alspaugh | Oct. 29, 1907 |
| 1,133,374 | Gamble | Mar. 30, 1915 |
| 1,227,391 | Cooper | May 22, 1917 |
| 1,286,897 | Albertson | Dec. 10, 1918 |
| 1,662,538 | Richmond et al. | Mar. 13, 1928 |
| 1,883,662 | Fisher | Oct. 18, 1932 |
| 2,050,005 | Heegeman | Aug. 4, 1936 |
| 2,429,967 | Sorensen | Oct. 28, 1947 |
| 2,688,795 | Schwenzfeier | Sept. 14, 1954 |
| 2,736,955 | Fuglie | Mar. 6, 1956 |